(12) United States Patent
Zhang et al.

(10) Patent No.: US 11,877,181 B2
(45) Date of Patent: Jan. 16, 2024

(54) CONGESTION CONTROL FOR MULTIPLE RADIO ACCESS TECHNOLOGIES ON AN UNLICENSED BAND

(71) Applicant: QUALCOMM Incorporated, San Diego, CA (US)

(72) Inventors: Xiaoxia Zhang, San Diego, CA (US); Jing Sun, San Diego, CA (US); Yisheng Xue, San Diego, CA (US); Tao Luo, San Diego, CA (US); Shuanshuan Wu, San Diego, CA (US); Arthur Gubeskys, San Diego, CA (US); Tien Viet Nguyen, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/349,625

(22) Filed: Jun. 16, 2021

(65) Prior Publication Data

US 2022/0038947 A1 Feb. 3, 2022

Related U.S. Application Data

(60) Provisional application No. 63/057,788, filed on Jul. 28, 2020.

(51) Int. Cl.
*H04W 28/02* (2009.01)
*H04W 16/14* (2009.01)
(Continued)

(52) U.S. Cl.
CPC ....... *H04W 28/0289* (2013.01); *H04W 16/14* (2013.01); *H04W 24/10* (2013.01);
(Continued)

(58) Field of Classification Search
CPC . H04W 28/0289; H04W 72/20; H04W 16/14; H04W 24/10; H04W 72/0446; H04W 92/18
See application file for complete search history.

(56) References Cited

U.S. PATENT DOCUMENTS

| 2016/0057770 A1* | 2/2016 | Yerramalli | H04W 74/08 370/329 |
|---|---|---|---|
| 2016/0095009 A1* | 3/2016 | Ling | H04W 24/10 370/329 |

(Continued)

OTHER PUBLICATIONS

Zhang et al., Efficient Mobility Management for Vertical Handoff between WWAN and WLAN, Nov. 2003, all. (Year: 2003).*

(Continued)

*Primary Examiner* — Christopher M Crutchfield
*Assistant Examiner* — Tito Q Pham
(74) *Attorney, Agent, or Firm* — QUALCOMM Incorporated

(57) ABSTRACT

Various aspects of the present disclosure generally relate to wireless communication. In some aspects, a user equipment (UE) may identify one or more channel occupancy times (COTs) associated with a first radio access technology (RAT) on an unlicensed band. The UE may calculate a congestion control parameter associated with a second RAT on the unlicensed band, wherein the congestion control parameter is calculated by excluding sub-channels in the one or more COTs. The UE may use the congestion control parameter to communicate via the unlicensed band. Numerous other aspects are provided.

23 Claims, 9 Drawing Sheets

(51) Int. Cl.
    *H04W 72/0446*  (2023.01)
    *H04W 92/18*    (2009.01)
    *H04W 24/10*    (2009.01)
    *H04W 72/20*    (2023.01)

(52) U.S. Cl.
    CPC ....... *H04W 72/0446* (2013.01); *H04W 72/20* (2023.01); *H04W 92/18* (2013.01)

(56) References Cited

U.S. PATENT DOCUMENTS

| | | | | |
|---|---|---|---|---|
| 2019/0349991 | A1* | 11/2019 | Mukherjee | H04L 5/1469 |
| 2020/0120710 | A1* | 4/2020 | Viorel | H04W 74/0808 |
| 2020/0229194 | A1 | 7/2020 | Belleschi et al. | |
| 2020/0245137 | A1* | 7/2020 | Chitrakar | H04W 52/0219 |
| 2021/0029768 | A1* | 1/2021 | Shih | H04W 72/0453 |
| 2022/0060929 | A1* | 2/2022 | Hassan | H04W 28/0231 |
| 2022/0061055 | A1* | 2/2022 | Freda | H04W 72/53 |
| 2022/0182979 | A1* | 6/2022 | Freda | H04W 72/56 |
| 2022/0256595 | A1* | 8/2022 | Wang | H04W 74/0866 |
| 2022/0264349 | A1* | 8/2022 | Liu | H04W 24/10 |
| 2023/0059505 | A1* | 2/2023 | Yao | H04W 74/0816 |
| 2023/0164814 | A1* | 5/2023 | Miao | H04W 72/40 370/329 |

OTHER PUBLICATIONS

International Search Report and Written Opinion—PCT/US2021/037851—ISA/EPO—dated Oct. 20, 2021.

* cited by examiner

CONGESTION CONTROL FOR MULTIPLE RADIO ACCESS TECHNOLOGIES ON AN UNLICENSED BAND

CROSS-REFERENCE TO RELATED APPLICATION

This Patent Application claims priority to Provisional Patent Application No. 63/057,788, filed on Jul. 28, 2020, entitled "CONGESTION CONTROL FOR MULTIPLE RADIO ACCESS TECHNOLOGIES ON AN UNLICENSED BAND," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for congestion control for multiple radio access technologies on an unlicensed band.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes: identifying one or more channel occupancy times (COTs) associated with a first radio access technology (RAT) on an unlicensed band; calculating a congestion control parameter associated with a second RAT on the unlicensed band, wherein the congestion control parameter is calculated by excluding sub-channels in the one or more COTs; and using the congestion control parameter to communicate via the unlicensed band.

In some aspects, a method of wireless communication performed by a first UE includes: receiving, from a second UE via a sidelink channel, an indication of one or more COTs associated with a first RAT on an unlicensed band; calculating a congestion control parameter associated with a second RAT on the unlicensed band, wherein the congestion control parameter is calculated by excluding sub-channels in the one or more COTs; and using the congestion control parameter to communicate via the unlicensed band.

In some aspects, a UE for wireless communication includes: a memory and one or more processors operatively coupled to the memory, the memory and the one or more processors configured to: identify one or more COTs associated with a first RAT on an unlicensed band; calculate a congestion control parameter associated with a second RAT on the unlicensed band, wherein the congestion control parameter is calculated by excluding sub-channels in the one or more COTs; and use the congestion control parameter to communicate via the unlicensed band.

In some aspects, a first UE for wireless communication includes: a memory and one or more processors operatively coupled to the memory, the memory and the one or more processors configured to: receive, from a second UE via a sidelink channel, an indication of one or more COTs associated with a first RAT on an unlicensed band; calculate a congestion control parameter associated with a second RAT on the unlicensed band, wherein the congestion control parameter is calculated by excluding sub-channels in the one or more COTs; and use the congestion control parameter to communicate via the unlicensed band.

In some aspects, a non-transitory computer-readable medium storing a set of instructions for wireless communication includes: one or more instructions that, when executed by one or more processors of a UE, cause the UE to: identify one or more COTs associated with a first RAT on an unlicensed band; calculate a congestion control parameter associated with a second RAT on the unlicensed band, wherein the congestion control parameter is calculated by excluding sub-channels in the one or more COTs; and use the congestion control parameter to communicate via the unlicensed band.

In some aspects, a non-transitory computer-readable medium storing a set of instructions for wireless communication includes: one or more instructions that, when executed by one or more processors of a first UE, cause the first UE to: receive, from a second UE via a sidelink channel, an indication of one or more COTs associated with a first RAT on an unlicensed band; calculate a congestion control parameter associated with a second RAT on the unlicensed band, wherein the congestion control parameter is calculated by excluding sub-channels in the one or more COTs; and use the congestion control parameter to communicate via the unlicensed band.

In some aspects, an apparatus for wireless communication includes: means for identifying one or more COTs associated with a first RAT on an unlicensed band; means for calculating a congestion control parameter associated with a second RAT on the unlicensed band, wherein the congestion control parameter is calculated by excluding sub-channels in the one or more COTs; and means for using the congestion control parameter to communicate via the unlicensed band.

In some aspects, a first apparatus for wireless communication includes: means for receiving, from a second apparatus via a sidelink channel, an indication of one or more COTs associated with a first RAT on an unlicensed band; means for calculating a congestion control parameter associated with a second RAT on the unlicensed band, wherein the congestion control parameter is calculated by excluding sub-channels in the one or more COTs; and means for using the congestion control parameter to communicate via the unlicensed band.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, RF chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
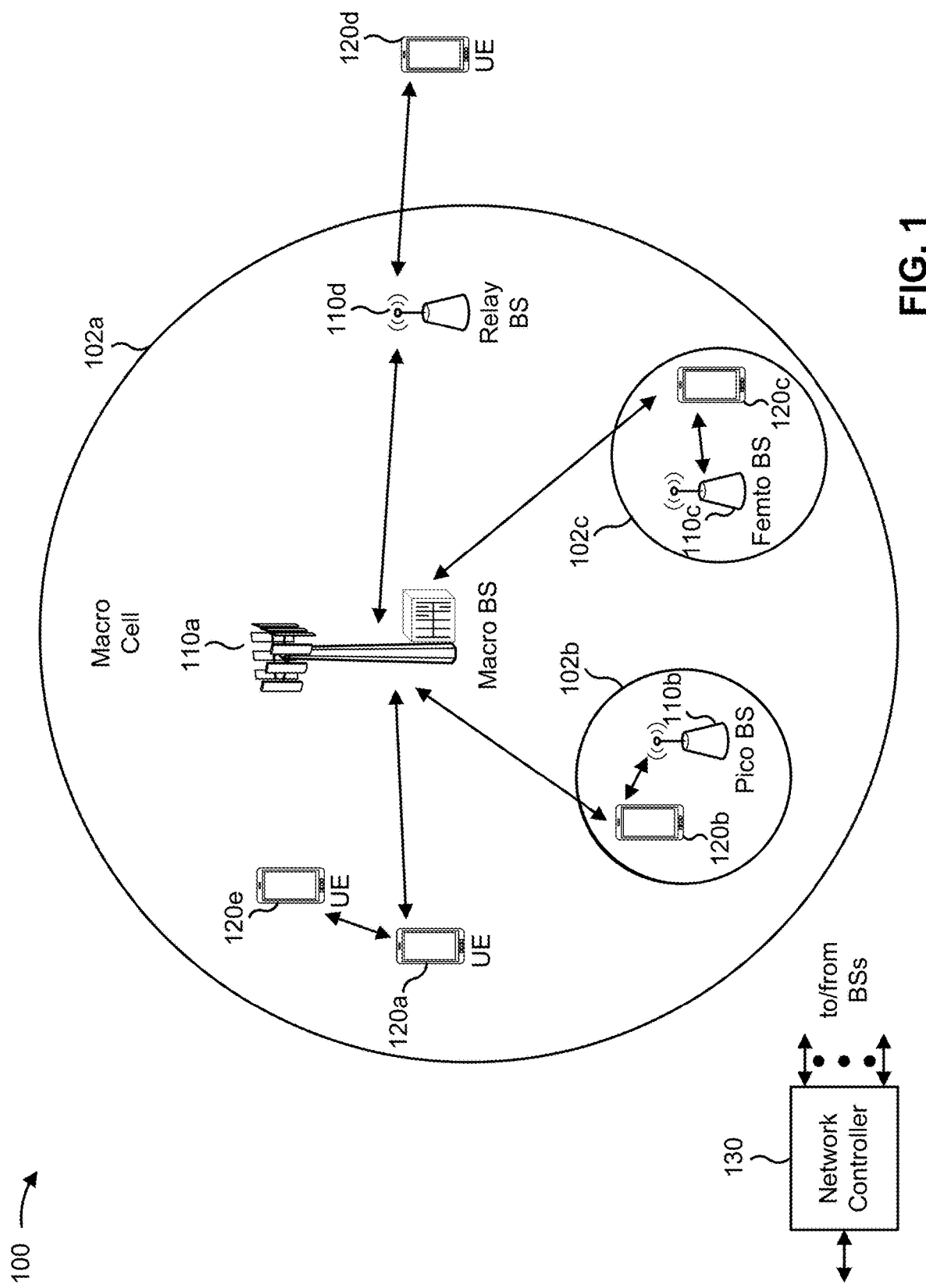
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 100b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
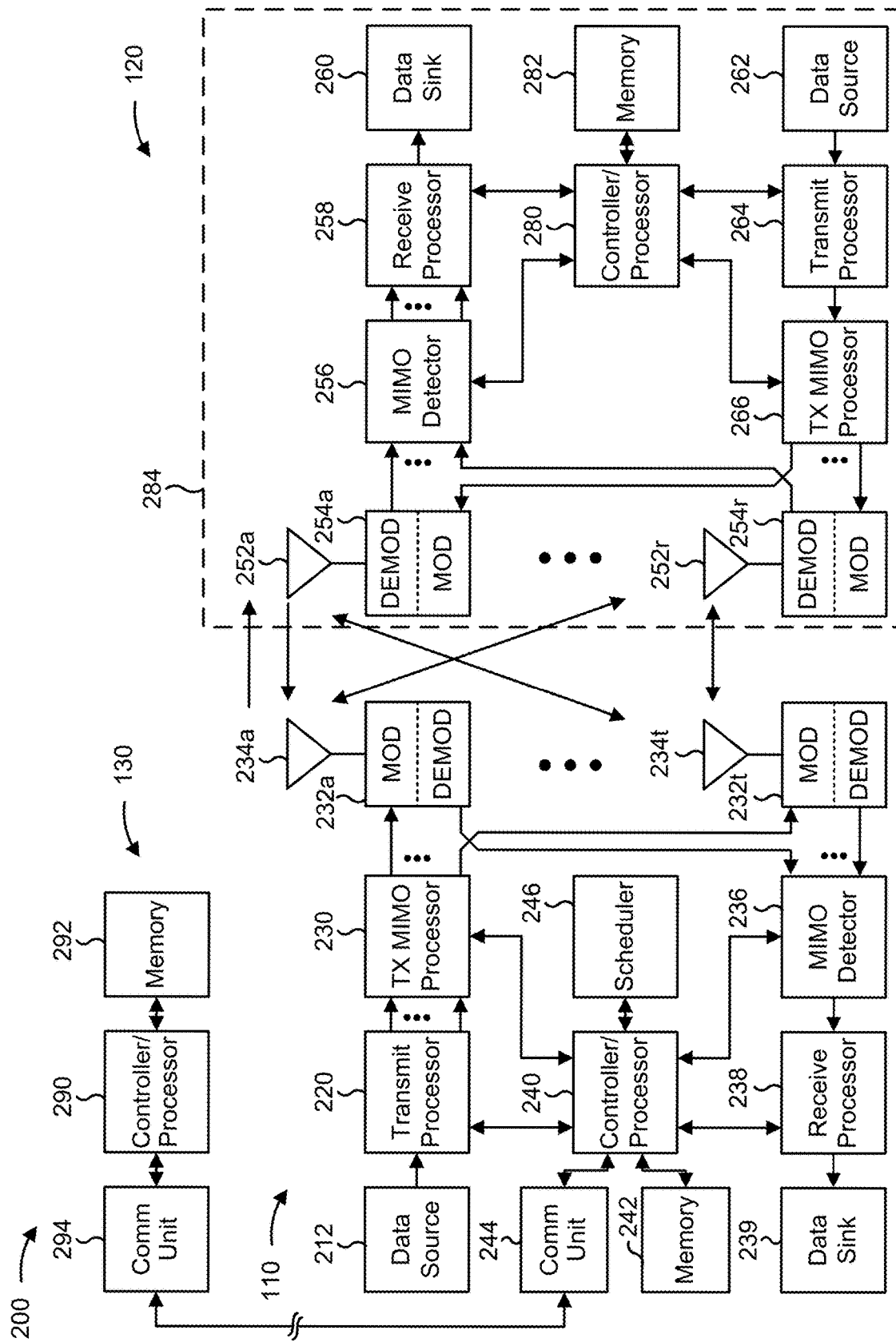
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through

254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 6-9.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 6-9.

Controller/processor 240 of base station 110, controller/processor 280 of UE 120, and/or any other component(s) of FIG. 2 may perform one or more techniques associated with congestion control for multiple radio access technologies on an unlicensed band, as described in more detail elsewhere herein. In some aspects, controller/processor 240 of base station 110, controller/processor 280 of UE 120, and/or any other component(s) of FIG. 2 may perform or direct operations of, for example, process 800 of FIG. 8, process 900 of FIG. 9, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, and/or program code) for wireless communication. In some aspects, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some aspects, executing instructions may include running the instructions, converting the instructions, compiling the instructions, and/or interpreting the instructions, among other examples.

In some aspects, a UE (e.g., UE 120) may include means for identifying one or more COTs associated with a first RAT on an unlicensed band; means for calculating a congestion control parameter associated with a second RAT on the unlicensed band, wherein the congestion control parameter is calculated by excluding sub-channels in the one or more COTs; and/or means for using the congestion control parameter to communicate via the unlicensed band. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

In some aspects, a first UE (e.g., UE 120) may include means for receiving, from a second UE via a sidelink channel, an indication of one or more COTs associated with a first RAT on an unlicensed band; means for calculating a congestion control parameter associated with a second RAT on the unlicensed band, wherein the congestion control parameter is calculated by excluding sub-channels in the one or more COTs; and/or means for using the congestion control parameter to communicate via the unlicensed band. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, and/or receive processor 258.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
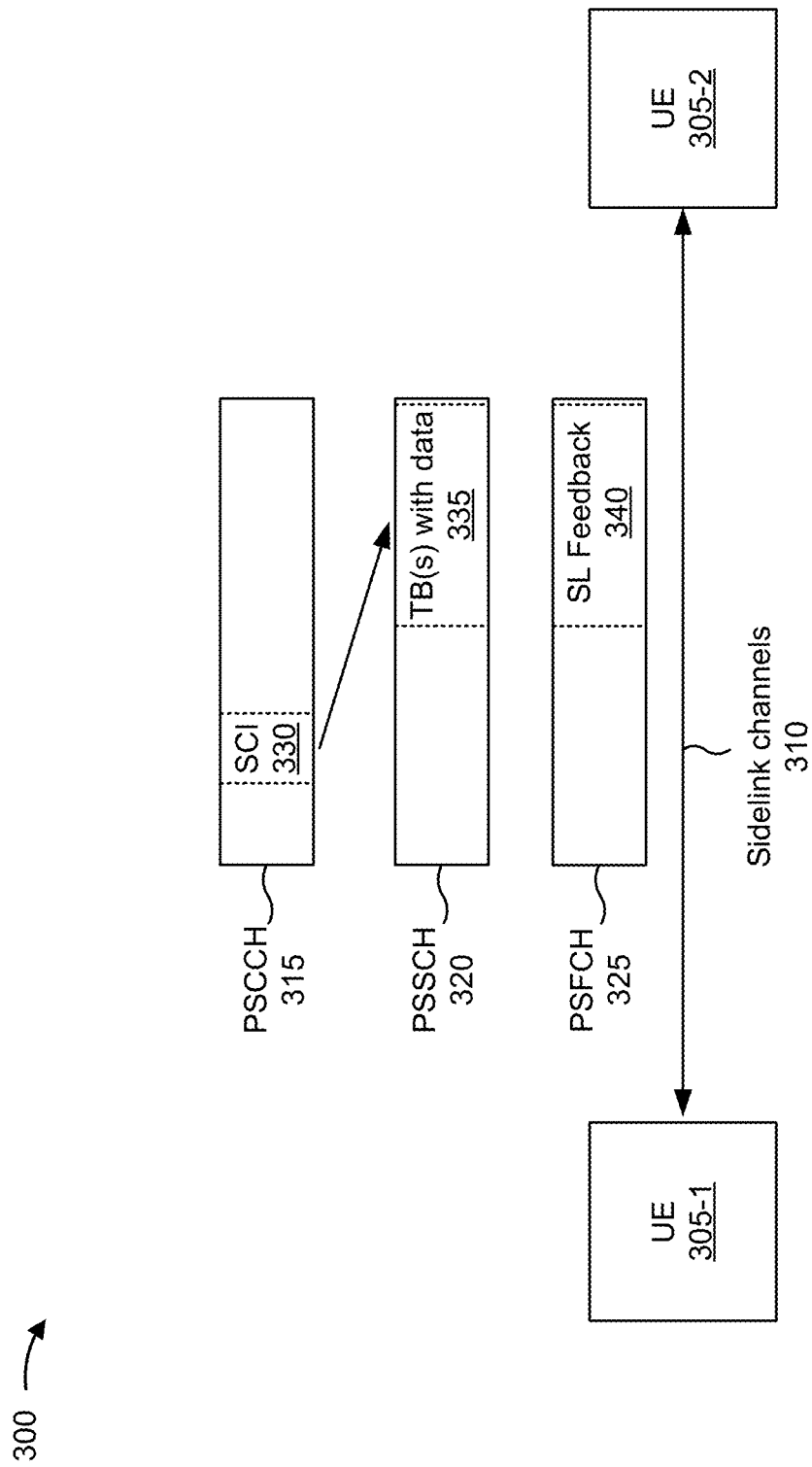
FIG. 3 is a diagram illustrating an example of sidelink communications, in accordance with the present disclosure.

FIG. 3 is a diagram illustrating an example 300 of sidelink communications, in accordance with the present disclosure.

As shown in FIG. 3, a first UE 305-1 may communicate with a second UE 305-2 (and one or more other UEs 305) via one or more sidelink channels 310. The UEs 305-1 and 305-2 may communicate using the one or more sidelink channels 310 for P2P communications, D2D communications, V2X communications (e.g., which may include V2V communications, V2I communications, and/or vehicle-to-person (V2P) communications), and/or mesh networking. In some aspects, the UEs 305 (e.g., UE 305-1 and/or UE 305-2) may correspond to one or more other UEs described elsewhere herein, such as UE 120. In some aspects, the one or more sidelink channels 310 may use a PC5 interface and/or may operate in a high frequency band (e.g., the 5.9 GHz band). Additionally, or alternatively, the UEs 305 may synchronize timing of transmission time intervals (TTIs) (e.g., frames, subframes, slots, and/or symbols) using global navigation satellite system (GNSS) timing.

As further shown in FIG. 3, the one or more sidelink channels 310 may include a physical sidelink control channel (PSCCH) 315, a physical sidelink shared channel (PSSCH) 320, and/or a physical sidelink feedback channel (PSFCH) 325. The PSCCH 315 may be used to communicate control information, similar to a physical downlink control channel (PDCCH) and/or a physical uplink control channel (PUCCH) used for cellular communications with a base station 110 via an access link or an access channel. The PSSCH 320 may be used to communicate data, similar to a physical downlink shared channel (PDSCH) and/or a physical uplink shared channel (PUSCH) used for cellular communications with a base station 110 via an access link or an access channel. In some aspects, the PSCCH 315 may carry sidelink control information (SCI) 330, which may indicate various control information used for sidelink communications, such as one or more resources (e.g., time resources, frequency resources, and/or spatial resources) where a transport block (TB) 335 may be carried on the PSSCH 320. The TB 335 may include data. The PSFCH 325 may be used to communicate sidelink feedback 340, such as hybrid automatic repeat request (HARQ) feedback (e.g., acknowledgement or negative acknowledgement (ACK/NACK) information), transmit power control (TPC), and/or a scheduling request (SR).

In some aspects, the one or more sidelink channels 310 may use resource pools. In some aspects, a scheduling assignment (e.g., included in SCI 330) may be transmitted in sub-channels using specific resource blocks (RBs) across time. In some aspects, data transmissions (e.g., on the PSSCH 320) associated with a scheduling assignment may occupy adjacent RBs in the same subframe as the scheduling assignment (e.g., using frequency division multiplexing). In some aspects, a scheduling assignment and associated data transmissions are not transmitted on adjacent RBs.

In some aspects, a UE 305 may operate using a transmission mode where resource selection and/or scheduling is performed by the UE 305 (e.g., rather than a base station 110). In some aspects, the UE 305 may perform resource selection and/or scheduling by sensing channel availability for transmissions. In some aspects, the UE 305 may measure an RSSI parameter (e.g., a sidelink-RSSI (S-RSSI) parameter) associated with various sidelink channels, may measure an RSRP parameter (e.g., a PSSCH-RSRP parameter) associated with various sidelink channels, may measure an RSRQ parameter (e.g., a PSSCH-RSRQ parameter) associated with various sidelink channels, and may select a channel for transmission of a sidelink communication based at least in part on the measurement(s).

Additionally, or alternatively, the UE 305 may perform resource selection and/or scheduling using SCI 330 received in the PSCCH 315, which may indicate occupied resources, and/or channel parameters. Additionally, or alternatively, the UE 305 may perform resource selection and/or scheduling by determining a channel busy ratio (CBR) associated with various sidelink channels, which may be used for rate control (e.g., by indicating a maximum number of resource blocks that the UE 305 can use for a particular set of subframes).

In the transmission mode where resource selection and/or scheduling is performed by a UE 305, the UE 305 may generate sidelink grants, and may transmit the grants in SCI 330. A sidelink grant may indicate one or more parameters (e.g., transmission parameters) to be used for an upcoming sidelink transmission, such as one or more resource blocks to be used for the upcoming sidelink transmission on the PSSCH 320 (e.g., for TBs 335), one or more subframes to be used for the upcoming sidelink transmission, and/or an MCS to be used for the upcoming sidelink transmission. In some aspects, a UE 305 may generate a sidelink grant that indicates one or more parameters for semi-persistent scheduling (SPS), such as a periodicity of a sidelink transmission. Additionally, or alternatively, the UE 305 may generate a sidelink grant for event-driven scheduling, such as for an on-demand sidelink message.

As indicated above, FIG. 3 is provided as an example. Other examples may differ from what is described with respect to FIG. 3.

Figure 4:
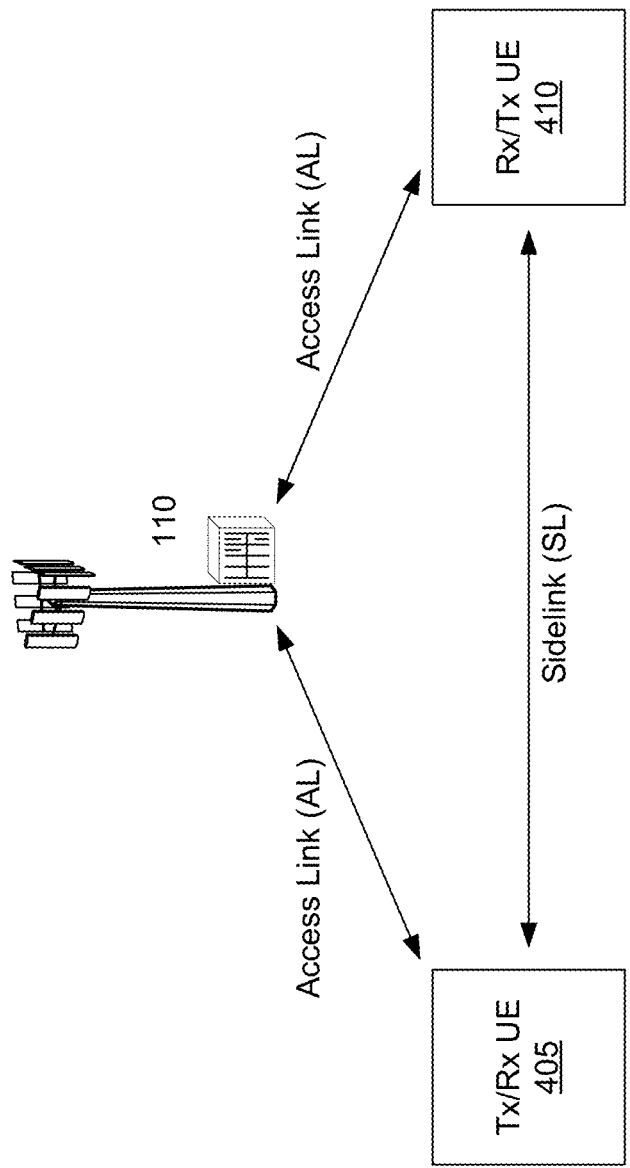
FIG. 4 is a diagram illustrating an example of sidelink communications and access link communications, in accordance with the present disclosure.

FIG. 4 is a diagram illustrating an example 400 of sidelink communications and access link communications, in accordance with the present disclosure.

As shown in FIG. 4, a transmitter (Tx)/receiver (Rx) UE 405 and an Rx/Tx UE 410 may communicate with one another via a sidelink, as described above in connection with FIG. 3. As further shown, in some sidelink modes, a base station 110 may communicate with the Tx/Rx UE 405 via a first access link. Additionally, or alternatively, in some sidelink modes, the base station 110 may communicate with the Rx/Tx UE 410 via a second access link. The Tx/Rx UE 405 and/or the Rx/Tx UE 410 may correspond to one or more UEs described elsewhere herein, such as the UE 120 of FIG. 1. Thus, a direct link between UEs 120 (e.g., via a PC5 interface) may be referred to as a sidelink, and a direct link between a base station 110 and a UE 120 (e.g., via a Uu interface) may be referred to as an access link. Sidelink communications may be transmitted via the sidelink, and access link communications may be transmitted via the access link. An access link communication may be either a downlink communication (from a base station 110 to a UE 120) or an uplink communication (from a UE 120 to a base station 110).

As indicated above, FIG. 4 is provided as an example. Other examples may differ from what is described with respect to FIG. 4.

Figure 5:
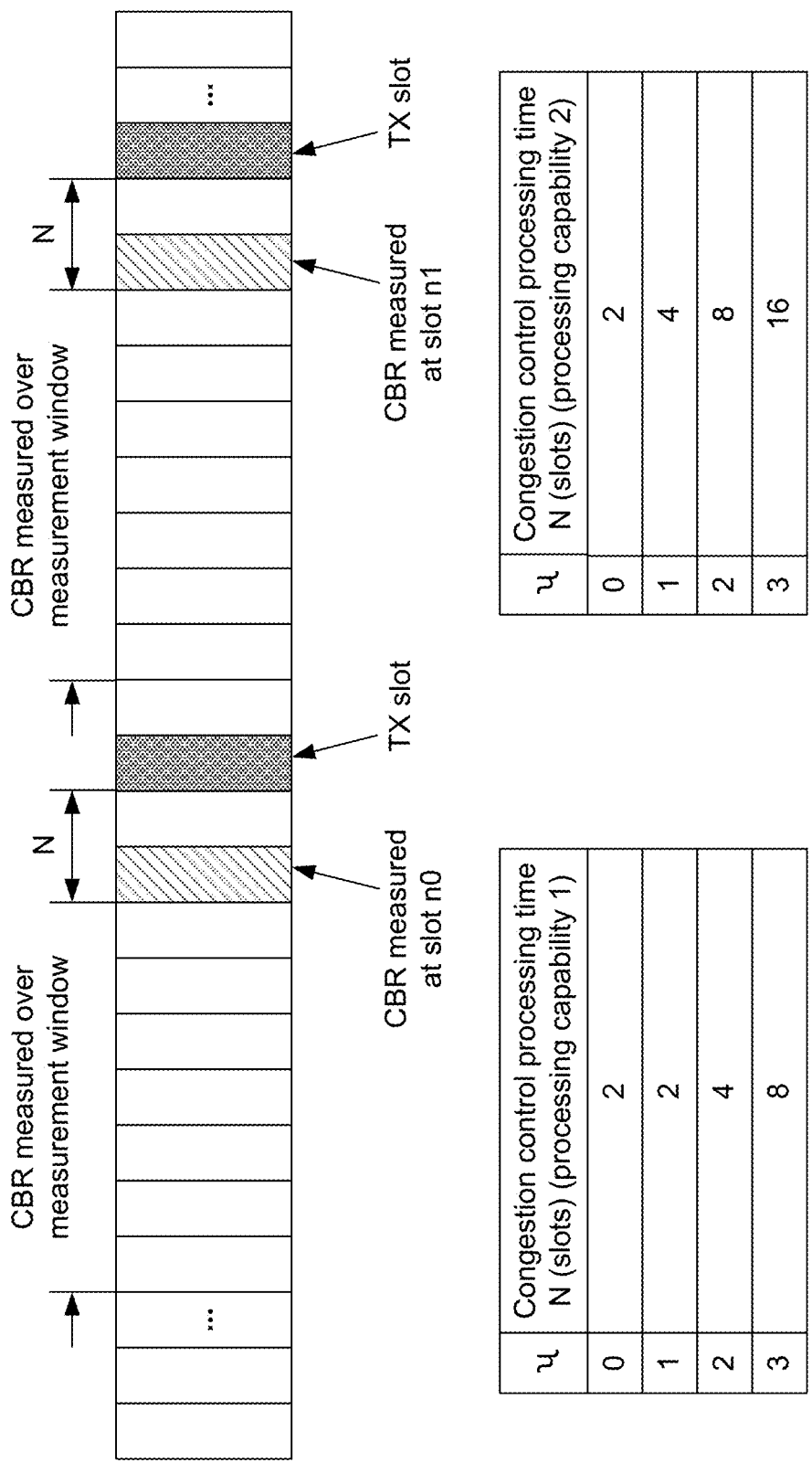
FIG. 5 is a diagram illustrating an example of congestion control parameter measurements, in accordance with the present disclosure.

FIG. 5 is a diagram illustrating an example 500 of congestion control parameter measurements, in accordance with the present disclosure.

In some aspects, a UE may measure one or more sidelink congestion control parameters for an unlicensed band. The sidelink congestion control parameters may include a sidelink CBR and/or a sidelink channel occupancy ratio (CR). The sidelink CBR and the sidelink CR may be used as metrics for sidelink congestion control on the unlicensed band.

In some aspects, sidelink congestion control may affect or restrict one or more transmission parameters of the UE. The transmission parameters may include MCS indices and MCS tables, a number of sub-channels per transmission, a number of retransmissions, a transmission power, and/or a CR limit.

In some aspects, the UE may perform a transmission over a sidelink channel according to a first set of transmission parameters when the sidelink congestion control parameters indicate the channel congestion satisfies a threshold. Conversely, the UE may perform a transmission over the sidelink channel according to a second set of transmission parameters when the sidelink congestion control parameters indicate the channel congestion does not satisfy the threshold.

In some aspects, a UE may measure or estimate the sidelink CBR based at least in part on a sidelink received signal strength indicator (RSSI) measurement. The sidelink RSSI may be defined as a linear average of a total received power (in watts, W) observed in a configured sub-channel in OFDM symbols of a slot configured for a PSCCH or a PSSCH, starting from a second OFDM symbol in the slot. The UE may measure the sidelink CBR at slot n, where the sidelink CBR may be defined as a portion of sub-channels in a resource pool whose sidelink RSSI measured by the UE satisfies a preconfigured threshold sensed over a measurement window. The measurement window may be defined by [n−a, n−1], wherein a is a positive integer equal to 100 or $100 \cdot 2^\mu$ slots, in accordance with a time window size CBR (timeWindowSize-CBR) higher layer parameter. The parameter p may be a positive integer that indicates a New Radio numerology. Thus, the measurement window may be a sliding measurement window depending on the values of n and a.

As shown in FIG. 5, a UE may measure or estimate the sidelink CBR at slot n (e.g., slot n0 or slot n1) based at least in part on the sidelink RSSI measurement. The sidelink CBR measured at slot n may correspond to the measurement window. The UE may perform a transmission in a transmit (Tx) slot after measuring the sidelink CBR at slot n, subject to a congestion control processing time (N) (in slots). As shown in FIG. 5, N may be equal to two slots, but this is not intended to be limiting. The UE may perform the transmission in the Tx slot according to the sidelink CBR measured at a previous n slot. In some aspects, the UE may restrict a transmission power, and/or a number of retransmissions, depending on the sidelink CBR measured at the previous n slot.

In some aspects, as shown in FIG. 5, N may depend on a UE processing capability and a value of p (the New Radio numerology). In some aspects, for a first UE processing capability, N is equal to 2 when $\mu$ is equal to 0, N is equal to 2 when $\mu$ is equal to 1, N is equal to 4 when $\mu$ is equal to 2, or N is equal to 8 when $\mu$ is equal to 3. For a second UE processing capability, N is equal to 2 when $\mu$ is equal to 0, N is equal to 4 when $\mu$ is equal to 1, N is equal to 8 when $\mu$ is equal to 2, or N is equal to 16 when $\mu$ is equal to 3. In some aspects, the UE may apply a single processing capability (e.g., the first UE processing capability or the second UE processing capability) in sidelink congestion control.

In some aspects, a UE may determine the sidelink CR at slot n as an additional metric for sidelink congestion control. The sidelink CR may be defined as a total number of sub-channels used for transmissions in slots [n−a, n−1] and granted in slots [n, n+b] divided by a total number of configured sub-channels in a transmission pool over [n−a, n+b]. Additionally, a and b are positive integers determined by UE implementation, with a+b+1 equal to 1000 or 1000·$2^\mu$ slots.

In some aspects, the UE may be configured with a sidelink CR limit (sl-CR-Limit) higher layer parameter and the UE may transmit a PSSCH in slot n. In this case, the UE may ensure, for a priority value k, the following limits of $E_{i \geq k}$ CR(i)≤$CR_{Limit}$(k), where CR(i) is the CR evaluated in slot n-N for PSSCH transmissions with a "Priority" field in SCI set to i, and $CR_{Limit}$(k) corresponds to the sl-CR-Limit higher layer parameter that is associated with the priority value k and a CBR range which includes the sidelink CBR measured in slot n-N, as shown in FIG. 5. The limits of $Z_{i \geq k}$ CR(i)≤$CR_{Limit}$(k) may be achieved by UE implementation, which may include the UE dropping one or more transmissions in slot n to satisfy the limits.

In some cases, sidelink quality of service (QoS) management solutions within UEs (or sidelink nodes) may be a function of sidelink CBR and sidelink CR. However, in the presence of multiple RATs on an unlicensed band, a sidelink RSSI measurement used for the sidelink CBR measurement may include transmissions associated with multiple RATs on the unlicensed band. In some aspects, the presence of both a first RAT and a second RAT may cause a sidelink RSSI measurement used for the sidelink CBR measurement to include transmissions associated with both the first RAT and the second RAT. The first RAT may include a WiFi RAT, a New Radio uplink/downlink RAT, and/or a Bluetooth RAT, and the second RAT may include a New Radio sidelink RAT. Due to the presence of both the first RAT and the second RAT (e.g., the first RAT interferes with the second RAT), a measured sidelink RSSI and sidelink CBR and/or sidelink CR for the second RAT may not accurately represent a sidelink congestion control metric for the UE. Additionally, when evaluating the sidelink CR, a total number of sub-channels may include sub-channels in which the UE cannot transmit due to first RAT interference, such that the measured sidelink CR may not accurately represent a level of sidelink congestion. With an inaccurate understanding of the sidelink CBR and sidelink CR due to the presence of the first RAT, the UE may incorrectly adjust or not adjust the transmission parameters for sidelink congestion control, thereby negatively affecting the performance of the UE.

Various aspects of techniques and apparatuses described herein may facilitate improving an accuracy of the measured sidelink CBR and sidelink CR in the presence of first RAT interference by detecting a COT of a first RAT (e.g., a WiFi RAT) and measuring the sidelink CBR and sidelink CR outside of the COT of the first RAT. As a result, the measurement accuracy of the sidelink CBR and the sidelink CR by the UE may not be affected by the presence of the first RAT because the sidelink CBR and the sidelink CR are measured outside of the COT of the first RAT. Further, by having an accurate understanding of the level of sidelink congestion or lack thereof, the UE may perform transmissions over the sidelink channel accordingly (e.g., by using an appropriate set of transmission parameters).

In various aspects of techniques and apparatuses described herein, a UE may measure the sidelink CBR and the sidelink CR when the UE does not detect a COT associated with a first RAT (e.g., WiFi RAT), which is in contrast to the previous solution of measuring the sidelink CBR and the sidelink CR within a COT associated with a second RAT (e.g., an NR sidelink RAT). In some aspects described herein, sub-channels within the COT associated with the first RAT may not be used for sidelink CBR measurement and sidelink CR measurement associated with the second RAT. In some aspects, for sidelink CBR, the UE may perform a sidelink RSSI measurement when the UE does not detect the COT associated with the first RAT. Additionally, for sidelink CR, a total number of configured sub-channels for sidelink CR evaluation by the UE may include sub-channels in which the UE does not detect the COT associated with the first RAT.

As indicated above, FIG. 5 is provided as an example. Other examples may differ from what is described with respect to FIG. 5.

Figure 6:
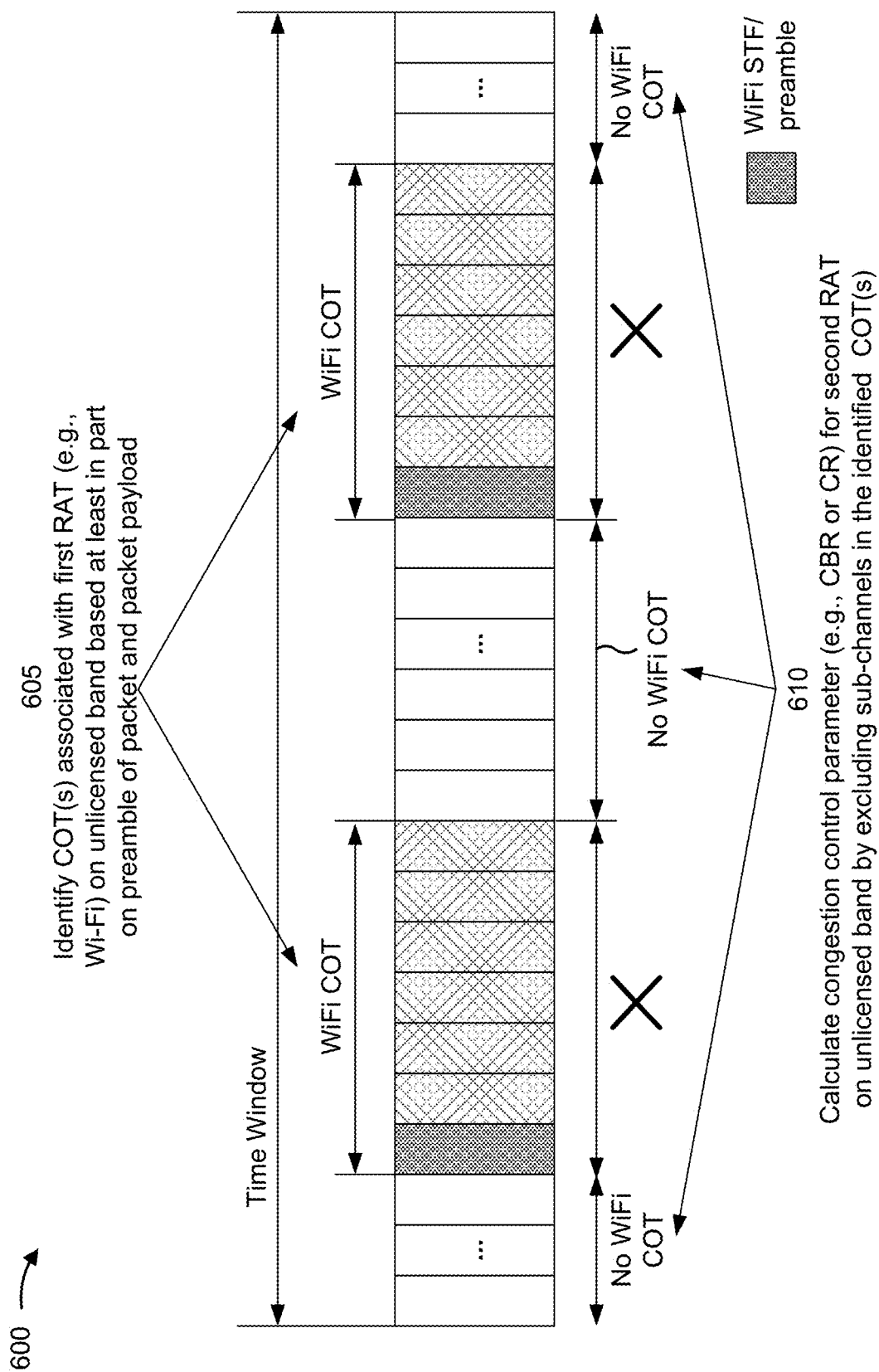
FIGS. 6-7 are diagrams illustrating examples associated with congestion control for multiple radio access technologies on an unlicensed band, in accordance with the present disclosure.

FIG. 6 is a diagram illustrating an example 600 of congestion control for multiple radio access technologies on an unlicensed band, in accordance with the present disclosure.

As shown by reference number 605, a UE (e.g., UE 120) may identify a COT associated with a first RAT on an unlicensed band. The UE may be configured to communicate using a second RAT, and possibly the first RAT, on the unlicensed band. In some aspects, the first RAT may be a WiFi RAT and the COT may be a WiFi COT, and the second RAT may be a New Radio sidelink RAT. The UE may identify the COT by identifying a start of the COT and an end of the COT. The UE may identify the start of the COT based at least in part on detecting a preamble of a packet associated with the first RAT. The UE may identify the end of the COT based at least in part on analyzing a payload of the packet associated with the first RAT. By identifying the start and end of the COT, the UE may determine a COT, which may be defined as a duration or number of sub-channels in a time domain. As described in further detail below, the UE may use the COT to calculate congestion control parameters associated with the second RAT on the unlicensed band.

In some aspects, the UE may identify the start of the COT based at least in part on detecting the preamble of the packet associated with the first RAT. In other words, the packet may be transmitted over the unlicensed band using the first RAT, and the transmission of the packet over the unlicensed band may be detected by the UE. The preamble may include a short training field (STF) that indicates, to the UE, the start of the COT. The preamble that includes the STF may be included in a packet header of the packet. When the first RAT corresponds to a WiFi RAT, the preamble may include an 8 μs STF as well as an 8 μs long training field (LTF). The STF and/or the LTF may indicate, to the UE, the start of the packet, and thereby the start of the COT associated with the first RAT.

The UE may identify the end of the COT based at least in part on detecting a payload of the packet associated with the first RAT. In some aspects, the UE may read the payload and identify a network allocation vector (NAV) (also referred to as NAV information) included in the payload. In some aspects, the NAV may include a duration field that specifies a transmission time associated with the packet. In some aspects, the duration field included in the NAV may be defined by a number of microseconds, and may be limited to a maximum of 32,767 microseconds. Based at least in part on the duration field in the NAV, the UE may determine the end of the packet, and thereby the end of the COT associated with the first RAT.

In some aspects, the UE may determine the COT based in part on the preamble, which may indicate the start of the COT associated with the first RAT, and the NAV included in the payload, which may indicate the end of the COT associated with the first RAT.

In some aspects, the first RAT (e.g., WiFi RAT) and the second RAT (e.g., New Radio sidelink RAT) may be associated with disparate numerologies. A "numerology" may refer to a configuration of waveform parameters, where different numerologies are considered as OFDM-based subframes having different parameters such as subcarrier spacing/symbol time, and/or cyclic prefix (CP) size. As a result of the disparate numerologies associated with the first RAT and the second RAT, UE detection of the preamble and/or packet associated with the first RAT may involve additional complexity or computations. In some aspects, the UE may perform a resampling to convert a numerology of the first RAT into a numerology of the second RAT to detect the payload preamble and/or packet associated with the first RAT.

As shown by reference number 610, the UE may calculate a congestion control parameter associated with the second RAT (e.g., New Radio sidelink RAT) on the unlicensed band. The congestion control parameter may be a sidelink CBR and/or a sidelink CR. In some aspects, the UE may calculate the congestion control parameter by excluding sub-channels in one or more COTs associated with the first RAT (e.g., WiFi RAT). In other words, the UE may calculate the congestion control parameter based at least in part on sub-channels associated with the second RAT, included in a time window, other than the sub-channels in the one or more COTs associated with the first RAT.

In some aspects, to calculate the sidelink CBR, the UE may determine a number of sub-channels in a measurement window, excluding sub-channels in one or more COTs associated with the first RAT, for which an RSSI measurement satisfies a threshold. The UE may divide the number of sub-channels by a total number of sub-channels in the measurement window, excluding the sub-channels in the one or more COTs associated with the first RAT, to determine the sidelink CBR. Each sub-channel in the one or more COTs may include a time domain element and a frequency domain element, such that each sub-channel used to calculate the sidelink CBR may include a time domain element and a frequency domain element. The time domain element used to calculate the sidelink CBR may include a set of symbols (e.g., all symbols) in a slot configured for a PSCCH or for a PSSCH, other than an initial symbol or first symbol of the slot.

In some aspects, to calculate the sidelink CR, the UE may determine a number of sub-channels, excluding sub-channels in one or more COTs associated with the first RAT, that are granted to, reserved by, or used for a transmission by the UE in a transmission pool. The UE may divide the number of sub-channels by a total number of sub-channels in the transmission pool, excluding the sub-channels in the one or more COTs associated with the first RAT, to determine the sidelink CR. Each sub-channel in the one or more COTs may include a time domain element and a frequency domain element, such that each sub-channel used to calculate the sidelink CR may include a time domain element and a frequency domain element. The time domain element used to calculate the sidelink CR may include a set of symbols (e.g., all symbols) in a slot configured for a PSCCH or for a PSSCH, other than an initial symbol or first symbol of the slot.

In some aspects, the UE may apply the congestion control parameters (e.g., the sidelink CBR and/or the sidelink CR) when communicating via the unlicensed band. In some aspects, depending on the congestion control parameters, the UE may adjust or restrict one or more transmission parameters. The transmission parameters may include MCS indices and MCS tables used by the UE, a number of sub-channels per transmission for the UE, a number of retransmissions permitted by the UE, a transmission power of the UE, and/or a CR limit restriction for the UE.

As described above, the UE (e.g., a first UE) may identify a COT associated with the first RAT (e.g., WiFi RAT) on the unlicensed band. In some aspects, the first UE may transmit an indication of the COT to a second UE over a sidelink channel. The second UE may receive, from the first UE and via the sidelink channel, the indication of the COT associated with the first RAT on the unlicensed band. The second UE may calculate a congestion control parameter (e.g., a sidelink CBR and/or a sidelink CR) associated with the second RAT (e.g., New Radio sidelink RAT) on the unlicensed band. The second UE may calculate the congestion control parameter by excluding sub-channels in the COT associated with the first RAT. The second UE may use the congestion control parameter to communicate via the unlicensed band.

In some aspects, the first UE may transmit the indication of the COT associated with the first RAT on the unlicensed band to a plurality of UEs over the sidelink channel. As a result, a first UE that successfully determines accurate COT information may share such information with other UEs, thereby causing the other UEs to perform sidelink CBR and sidelink CR measurements with increased accuracy.

In some aspects, as described above, the UE may be configured to communicate using a first RAT and a second RAT on the unlicensed band. In some aspects, the first RAT may be a New Radio unlicensed RAT and the second RAT may be a New Radio sidelink RAT operating in the unlicensed band. In these aspects, the New Radio sidelink RAT may share a medium with a New Radio unlicensed RAT deployment (e.g., a Uu interface associated with another operator). In these aspects, the UE may determine a COT associated with the first RAT (e.g., New Radio unlicensed RAT) using the techniques described above, and the UE may calculate congestion control parameter(s) by excluding sub-channels in the COT associated with the first RAT. In other words, the UE may exclude the sub-channels belonging to the other New Radio unlicensed RAT deployment or operator for congestion control evaluation. In some aspects, as described above, the UE may transmit COT information associated with the first RAT (e.g., New Radio unlicensed RAT) to other UEs to enable those other UEs to perform sidelink CBR and/or sidelink CR measurements with increased accuracy.

As indicated above, FIG. 6 is provided as an example. Other examples may differ from what is described with respect to FIG. 6.

Figure 7:
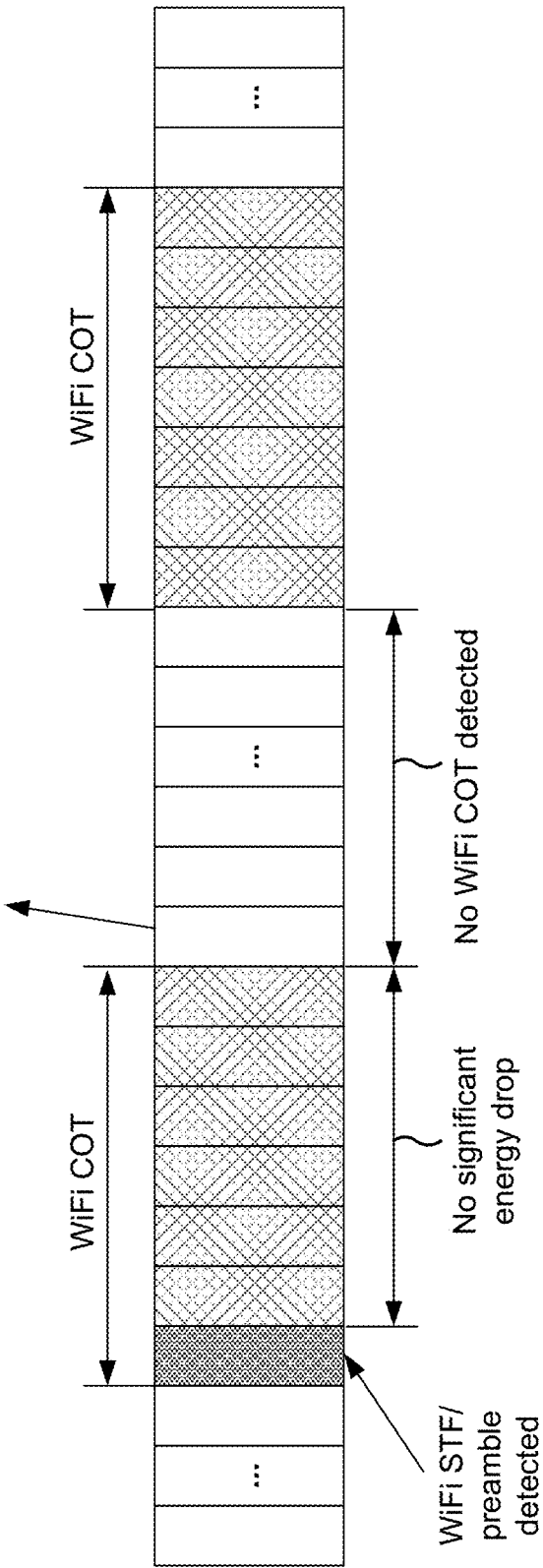

FIG. 7 is a diagram illustrating an example 700 of congestion control for multiple radio access technologies on an unlicensed band, in accordance with the present disclosure.

As shown by reference number 705, a UE may identify a COT associated with a first RAT on an unlicensed band. The UE may be configured to communicate using a second RAT, and possibly the first RAT, on the unlicensed band. In some aspects, the first RAT may be a WiFi RAT and the COT may be a WiFi COT, and the second RAT may be a New Radio sidelink RAT.

In some aspects, the UE may identify the COT based in part by identifying a start of the COT. The UE may identify the start of the COT based in part on detecting a preamble of a packet associated with the first RAT, as described above. The preamble may include an STF that indicates, to the UE, the start of the COT.

In some aspects, the UE may detect the preamble of the packet without identifying or receiving a payload of the packet. Therefore, in these aspects, the UE does not detect the packet including NAV information in order to determine the end of the COT, and thereby the COT.

In some aspects, the UE may determine or infer the end of the COT based at least in part on an energy level associated with the unlicensed band in relation to a threshold. The UE may detect a first energy level associated with the unlicensed band at a first time associated with the preamble. The UE may detect a second energy level associated with the unlicensed band at a second time. The UE may determine that a difference between the first energy level and the second energy level, detected at the second time after the first time, satisfies the threshold. The UE may identify the end of the COT based at least in part on determining that the difference between the first energy level and the second energy level satisfies the threshold.

In some aspects, the UE may detect an energy level associated with the unlicensed band when the preamble was received, and no significant energy drop (e.g., a change in energy that does not satisfy the threshold) over a number of sub-channels may indicate that the COT is still present for those sub-channels. On the other hand, when the UE detects a significant energy drop (e.g., a change in energy that satisfies the threshold) in the unlicensed band, the UE may infer or determine that a corresponding sub-channel (e.g., a sub-channel in a time domain in which the significant energy drop was experienced) may indicate the end of the COT. As a result, the UE may determine the start of the COT using the preamble and the end of the COT based in part on the energy level associated with the unlicensed band.

In some aspects, the UE may use the COT to calculate the congestion control parameter for the second RAT on the unlicensed band, as described with respect to FIG. 6.

In some aspects, when the UE does not detect the packet associated with the preamble, the UE may not perform a resampling to convert a numerology of the first RAT into a numerology of the second RAT. In other words, the UE may use a numerology associated with the second RAT (e.g., New Radio sidelink RAT) to detect the preamble associated with the first RAT (e.g., WiFi RAT) in a time domain without a resampling, which may reduce complexity and computations at the UE.

In some aspects, the UE (e.g., a first UE) may identify a COT associated with the first RAT (e.g., WiFi RAT) on the unlicensed band. In some aspects, the first UE may transmit an indication of the COT to a second UE over a sidelink channel. The second UE may receive, from the first UE and via the sidelink channel, the indication of the COT associated with the first RAT on the unlicensed band. The second UE may calculate a congestion control parameter (e.g., a sidelink CBR and/or a sidelink CR) associated with the second RAT (e.g., New Radio sidelink RAT) on the unlicensed band. The second UE may calculate the congestion control parameter by excluding sub-channels in the COT associated with the first RAT. The second UE may use the congestion control parameter to communicate via the unlicensed band.

In some aspects, the first UE may transmit the indication of the COT associated with the first RAT on the unlicensed band to a plurality of UEs over the sidelink channel. As a result, a first UE that successfully determines accurate COT information may share such information with other UEs, thereby causing the other UEs to perform sidelink CBR and sidelink CR measurements with increased accuracy.

In some aspects, as described above, the UE may be configured to communicate using a first RAT and a second RAT on the unlicensed band. In some aspects, the first RAT may be a New Radio unlicensed RAT and the second RAT may be a New Radio sidelink RAT operating in the unlicensed band. In these aspects, the New Radio sidelink RAT may share a medium with a New Radio unlicensed RAT deployment (e.g., a Uu interface associated with another operator). In these aspects, the UE may determine a COT associated with the first RAT (e.g., New Radio unlicensed RAT) using the techniques described above, and the UE may calculate congestion control parameter(s) by excluding sub-channels in the COT associated with the first RAT. In other words, the UE may exclude the sub-channels belonging to the other New Radio unlicensed RAT deployment or operator for congestion control evaluation. In some aspects, as described above, the UE may transmit COT information associated with the first RAT (e.g., New Radio unlicensed RAT) to other UEs to enable those UEs to perform sidelink CBR and sidelink CR measurements with increased accuracy.

As indicated above, FIG. 7 is provided as an example. Other examples may differ from what is described with respect to FIG. 7.

Figure 8:
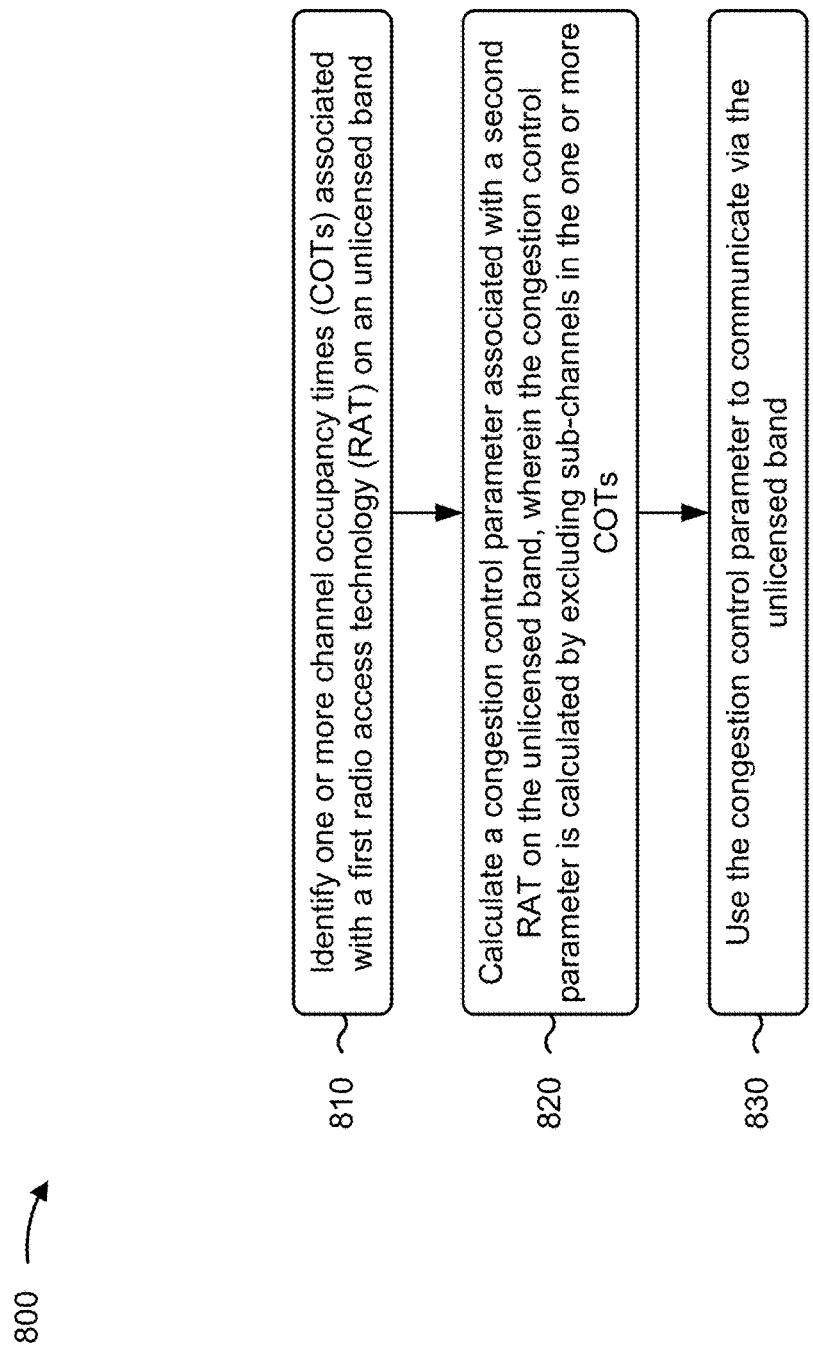
FIGS. 8-9 are diagrams illustrating example processes associated with congestion control for multiple radio access technologies on an unlicensed band, in accordance with the present disclosure.

FIG. 8 is a diagram illustrating an example process 800 performed, for example, by a UE, in accordance with the present disclosure. Example process 800 is an example where the UE (e.g., UE 120) performs operations associated with congestion control for multiple radio access technologies on an unlicensed band.

As shown in FIG. 8, in some aspects, process 800 may include identifying one or more COTs associated with a first RAT on an unlicensed band (block 810). For example, the UE (e.g., using antenna 252, demodulator 254, MIMO detector 256, receive processor 258, transmit processor 264, TX MIMO processor 266, modulator 254, controller/processor 280, and/or memory 282) may identify one or more COTs associated with a first RAT on an unlicensed band, as described above.

As further shown in FIG. 8, in some aspects, process 800 may include calculating a congestion control parameter associated with a second RAT on the unlicensed band, wherein the congestion control parameter is calculated by excluding sub-channels in the one or more COTs (block 820). For example, the UE (e.g., using antenna 252, demodulator 254, MIMO detector 256, receive processor 258, transmit processor 264, TX MIMO processor 266, modulator 254, controller/processor 280, and/or memory 282) may calculate a congestion control parameter associated with a second RAT on the unlicensed band, wherein the congestion control parameter is calculated by excluding sub-channels in the one or more COTs, as described above.

As further shown in FIG. 8, in some aspects, process 800 may include using the congestion control parameter to communicate via the unlicensed band (block 830). For example, the UE (e.g., using antenna 252, demodulator 254, MIMO detector 256, receive processor 258, transmit processor 264, TX MIMO processor 266, modulator 254, controller/processor 280, and/or memory 282) may use the congestion control parameter to communicate via the unlicensed band, as described above.

Process 800 may include additional aspects, such as any single aspect or any combination of aspects described below and/or in connection with one or more other processes described elsewhere herein.

In a first aspect, the congestion control parameter is calculated based at least in part on sub-channels, included in a time window, other than the sub-channels in the one or more COTs.

In a second aspect, alone or in combination with the first aspect, the one or more COTs are identified based at least in part on a preamble associated with the first RAT, a packet associated with the first RAT, or a combination thereof.

In a third aspect, alone or in combination with one or more of the first and second aspects, identifying a COT, of the one or more COTs, comprises identifying a start of the COT based at least in part on detecting a preamble of a packet associated with the first RAT, and identifying an end of the COT based at least in part on detecting a payload of the packet associated with the first RAT.

In a fourth aspect, alone or in combination with one or more of the first through third aspects, the first RAT is a Wi-Fi RAT, the preamble includes a short training field that indicates the start of the COT, and the payload includes a network allocation vector that indicates a duration of the COT.

In a fifth aspect, alone or in combination with one or more of the first through fourth aspects, detecting the payload of the packet associated with the first RAT comprises performing resampling to convert a numerology of the first RAT to a numerology of the second RAT.

In a sixth aspect, alone or in combination with one or more of the first through fifth aspects, identifying a COT, of the one or more COTs, comprises identifying a start of the COT based at least in part on detecting a preamble of a packet associated with the first RAT, detecting a first energy level associated with the unlicensed band at a first time associated with the preamble, determining that a difference between the first energy level and a second energy level, detected at a second time after the first time, satisfies a threshold, and identifying an end of the COT based at least in part on determining that the difference between the first energy level and the second energy level satisfies the threshold.

In a seventh aspect, alone or in combination with one or more of the first through sixth aspects, process 800 includes transmitting an indication of the one or more COTs to one or more wireless communication devices.

In an eighth aspect, alone or in combination with one or more of the first through seventh aspects, the first RAT is a Wi-Fi RAT and the second RAT is a New Radio RAT.

In a ninth aspect, alone or in combination with one or more of the first through eighth aspects, the first RAT is a New Radio uplink/downlink RAT and the second RAT is a New Radio sidelink RAT.

In a tenth aspect, alone or in combination with one or more of the first through ninth aspects, the congestion control parameter is at least one of a channel busy ratio or a channel occupancy ratio.

In an eleventh aspect, alone or in combination with one or more of the first through tenth aspects, the congestion control parameter is a channel busy ratio that is calculated based at least in part on determining a number of sub-channels in a measurement window, excluding the sub-channels in the one or more COTs, for which a received signal strength indicator measurement satisfies a threshold, and dividing the number of sub-channels by a total number of sub-channels in the measurement window excluding the sub-channels in the one or more COTs.

In a twelfth aspect, alone or in combination with one or more of the first through eleventh aspects, the congestion control parameter is a channel occupancy ratio that is calculated based at least in part on determining a number of sub-channels, excluding the sub-channels in the one or more COTs, that are granted to, reserved by, or used for a transmission by the UE in a transmission pool, and dividing the number of sub-channels by a total number of sub-channels in the transmission pool excluding the sub-channels in the one or more COTs.

In a thirteenth aspect, alone or in combination with one or more of the first through twelfth aspects, each sub-channel in the one or more COTs includes a time domain component and a frequency domain component, and wherein each sub-channel used to calculate the congestion control parameter includes a time domain component and a frequency domain component.

In a fourteenth aspect, alone or in combination with one or more of the first through thirteenth aspects, the time domain component includes all symbols in a slot configured for a physical sidelink control channel or for a physical sidelink shared channel other than an initial symbol of the slot.

In a fifteenth aspect, alone or in combination with one or more of the first through fourteenth aspects, the second RAT is a sidelink RAT.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
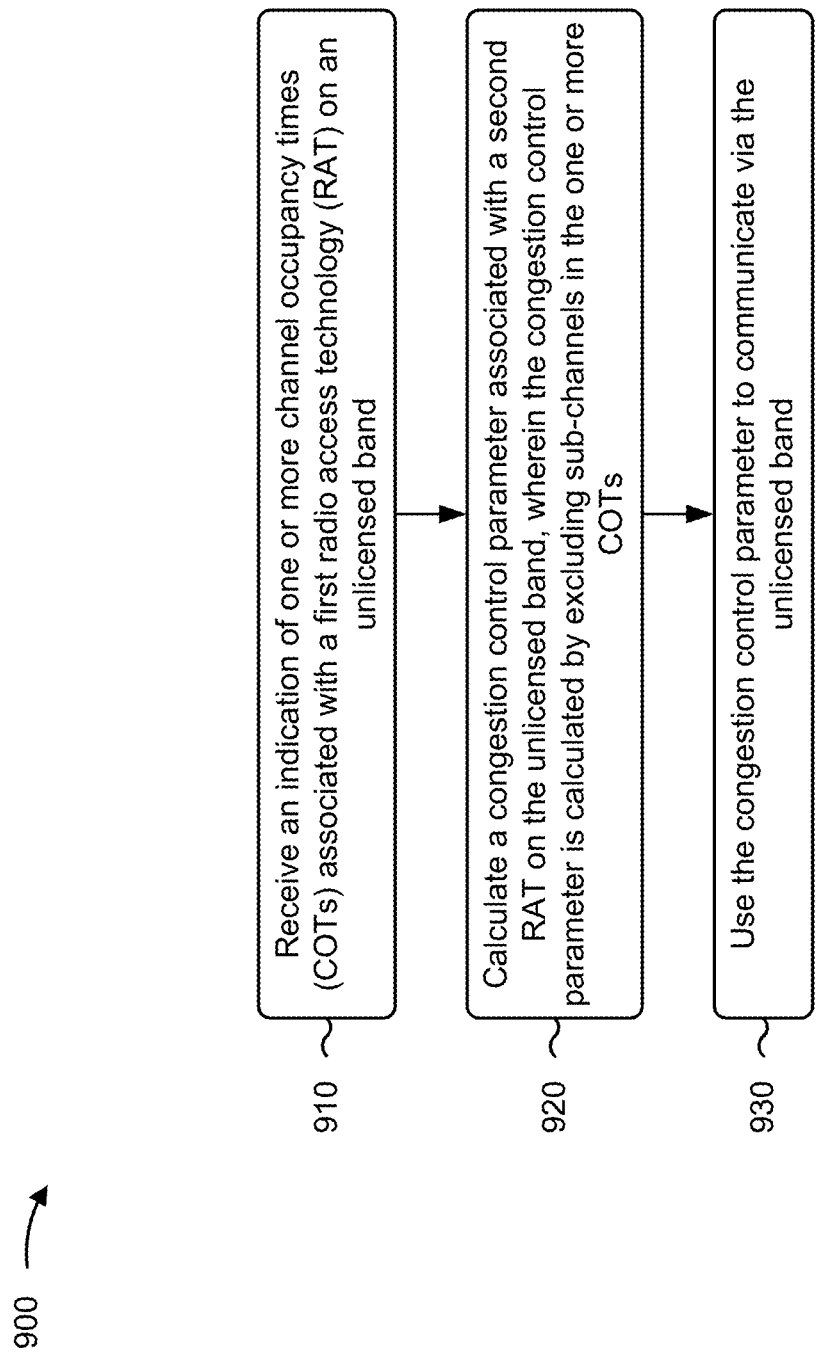

FIG. 9 is a diagram illustrating an example process 900 performed, for example, by a first UE, in accordance with the present disclosure. Example process 900 is an example where the UE (e.g., UE 120) performs operations associated with congestion control for multiple radio access technologies on an unlicensed band.

As shown in FIG. 9, in some aspects, process 900 may include receiving, from a second UE via a sidelink channel, an indication of one or more COTs associated with a first RAT on an unlicensed band (block 910). For example, the first UE (e.g., using antenna 252, demodulator 254, MIMO detector 256, receive processor 258, controller/processor 280, and/or memory 282) may receive, from a second UE via a sidelink channel, an indication of one or more COTs associated with a first RAT on an unlicensed band, as described above.

As further shown in FIG. 9, in some aspects, process 900 may include calculating a congestion control parameter associated with a second RAT on the unlicensed band, wherein the congestion control parameter is calculated by excluding sub-channels in the one or more COTs (block 920). For example, the UE (e.g., using antenna 252, demodulator 254, MIMO detector 256, receive processor 258, transmit processor 264, TX MIMO processor 266, modulator 254, controller/processor 280, and/or memory 282) may calculate a congestion control parameter associated with a second RAT on the unlicensed band, wherein the congestion control parameter is calculated by excluding sub-channels in the one or more COTs, as described above.

As further shown in FIG. 9, in some aspects, process 900 may include using the congestion control parameter to communicate via the unlicensed band (block 930). For example, the UE (e.g., using antenna 252, demodulator 254, MIMO detector 256, receive processor 258, transmit processor 264, TX MIMO processor 266, modulator 254, controller/processor 280, and/or memory 282) may use the congestion control parameter to communicate via the unlicensed band, as described above.

Process 900 may include additional aspects, such as any single aspect or any combination of aspects described below and/or in connection with one or more other processes described elsewhere herein.

In a first aspect, the congestion control parameter is calculated based at least in part on sub-channels, included in a time window, other than the sub-channels in the one or more COTs.

In a second aspect, alone or in combination with the first aspect, the first RAT is a Wi-Fi RAT and the second RAT is a New Radio RAT.

In a third aspect, alone or in combination with one or more of the first and second aspects, the first RAT is a New Radio uplink/downlink RAT and the second RAT is a New Radio sidelink RAT.

In a fourth aspect, alone or in combination with one or more of the first through third aspects, the congestion control parameter is at least one of a channel busy ratio or a channel occupancy ratio.

In a fifth aspect, alone or in combination with one or more of the first through fourth aspects, the congestion control parameter is a channel busy ratio that is calculated based at least in part on determining a number of sub-channels in a measurement window, excluding the sub-channels in the one or more COTs, for which a received signal strength indicator measurement satisfies a threshold, and dividing the number of sub-channels by a total number of sub-channels in the measurement window excluding the sub-channels in the one or more COTs.

In a sixth aspect, alone or in combination with one or more of the first through fifth aspects, the congestion control parameter is a channel occupancy ratio that is calculated based at least in part on determining a number of sub-channels, excluding the sub-channels in the one or more COTs, that are granted to, reserved by, or used for a transmission by the UE in a transmission pool, and dividing the number of sub-channels by a total number of sub-channels in the transmission pool excluding the sub-channels in the one or more COTs.

In a seventh aspect, alone or in combination with one or more of the first through sixth aspects, each sub-channel in the one or more COTs includes a time domain component and a frequency domain component, and wherein each sub-channel used to calculate the congestion control parameter includes a time domain component and a frequency domain component.

In an eighth aspect, alone or in combination with one or more of the first through seventh aspects, the time domain component includes all symbols in a slot configured for a physical sidelink control channel or for a physical sidelink shared channel other than an initial symbol of the slot.

In a ninth aspect, alone or in combination with one or more of the first through eighth aspects, the second RAT is a sidelink RAT.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

The following provides an overview of some Aspects of the present disclosure:

Aspect 1: A method of wireless communication performed by a user equipment (UE), comprising: identifying one or more channel occupancy times (COTs) associated with a first radio access technology (RAT) on an unlicensed band; calculating a congestion control parameter associated with a second RAT on the unlicensed band, wherein the congestion control parameter is calculated by excluding sub-channels in the one or more COTs; and using the congestion control parameter to communicate via the unlicensed band.

Aspect 2: The method of Aspect 1, wherein the congestion control parameter is calculated based at least in part on sub-channels, included in a time window, other than the sub-channels in the one or more COTs.

Aspect 3: The method of any of Aspects 1 through 2, wherein the one or more COTs are identified based at least in part on a preamble associated with the first RAT, a packet associated with the first RAT, or a combination thereof.

Aspect 4: The method of any of Aspects 1 through 3, wherein identifying a COT, of the one or more COTs, comprises: identifying a start of the COT based at least in part on detecting a preamble of a packet associated with the first RAT; and identifying an end of the COT based at least in part on detecting a payload of the packet associated with the first RAT.

Aspect 5: The method of Aspect 4, wherein the first RAT is a Wi-Fi RAT, the preamble includes a short training field that indicates the start of the COT, and the payload includes a network allocation vector that indicates a duration of the COT.

Aspect 6: The method of Aspect 4, wherein detecting the payload of the packet associated with the first RAT comprises performing resampling to convert a numerology of the first RAT to a numerology of the second RAT.

Aspect 7: The method of any of Aspects 1 through 6, wherein identifying a COT, of the one or more COTs, comprises: identifying a start of the COT based at least in part on detecting a preamble of a packet associated with the first RAT; detecting a first energy level associated with the unlicensed band at a first time associated with the preamble; determining that a difference between the first energy level and a second energy level, detected at a second time after the first time, satisfies a threshold; and identifying an end of the COT based at least in part on determining that the difference between the first energy level and the second energy level satisfies the threshold.

Aspect 8: The method of any of Aspects 1 through 7, further comprising transmitting an indication of the one or more COTs to one or more wireless communication devices.

Aspect 9: The method of any of Aspects 1 through 8, wherein the first RAT is a Wi-Fi RAT and the second RAT is a New Radio RAT.

Aspect 10: The method of any of Aspects 1 through 9, wherein the first RAT is a New Radio uplink/downlink RAT and the second RAT is a New Radio sidelink RAT.

Aspect 11: The method of any of Aspects 1 through 10, wherein the congestion control parameter is at least one of a channel busy ratio or a channel occupancy ratio.

Aspect 12: The method of any of Aspects 1 through 11, wherein the congestion control parameter is a channel busy ratio that is calculated based at least in part on: determining a number of sub-channels in a measurement window, excluding the sub-channels in the one or more COTs, for which a received signal strength indicator measurement satisfies a threshold; and dividing the number of sub-channels by a total number of sub-channels in the measurement window excluding the sub-channels in the one or more COTs.

Aspect 13: The method of any of Aspects 1 through 12, wherein the congestion control parameter is a channel occupancy ratio that is calculated based at least in part on: determining a number of sub-channels, excluding the sub-channels in the one or more COTs, that are granted to, reserved by, or used for a transmission by the UE in a transmission pool; and dividing the number of sub-channels by a total number of sub-channels in the transmission pool excluding the sub-channels in the one or more COTs.

Aspect 14: The method of any of Aspects 1 through 13, wherein each sub-channel in the one or more COTs includes a time domain component and a frequency domain component, and wherein each sub-channel used to calculate the congestion control parameter includes a time domain component and a frequency domain component.

Aspect 15: The method of Aspect 14, wherein the time domain component includes all symbols in a slot configured for a physical sidelink control channel or for a physical sidelink shared channel other than an initial symbol of the slot.

Aspect 16: The method of any of Aspects 1 through 15, wherein the second RAT is a sidelink RAT.

Aspect 17: A method of wireless communication performed by a first user equipment (UE), comprising: receiving, from a second UE via a sidelink channel, an indication of one or more channel occupancy times (COTs) associated with a first radio access technology (RAT) on an unlicensed band; calculating a congestion control parameter associated with a second RAT on the unlicensed band, wherein the congestion control parameter is calculated by excluding sub-channels in the one or more COTs; and using the congestion control parameter to communicate via the unlicensed band.

Aspect 18: The method of Aspect 17, wherein the congestion control parameter is calculated based at least in part on sub-channels, included in a time window, other than the sub-channels in the one or more COTs.

Aspect 19: The method of any of Aspects 17 through 18, wherein the first RAT is a Wi-Fi RAT and the second RAT is a New Radio RAT.

Aspect 20: The method of any of Aspects 17 through 19, wherein the first RAT is a New Radio uplink/downlink RAT and the second RAT is a New Radio sidelink RAT.

Aspect 21: The method of any of Aspects 17 through 20, wherein the congestion control parameter is at least one of a channel busy ratio or a channel occupancy ratio.

Aspect 22: The method of any of Aspects 17 through 21, wherein the congestion control parameter is a channel busy ratio that is calculated based at least in part on: determining a number of sub-channels in a measurement window, excluding the sub-channels in the one or more COTs, for which a received signal strength indicator measurement satisfies a threshold; and dividing the number of sub-channels by a total number of sub-channels in the measurement window excluding the sub-channels in the one or more COTs.

Aspect 23: The method of any of Aspects 17 through 22, wherein the congestion control parameter is a channel occupancy ratio that is calculated based at least in part on: determining a number of sub-channels, excluding the sub-channels in the one or more COTs, that are granted to, reserved by, or used for a transmission by the UE in a transmission pool; and dividing the number of sub-channels by a total number of sub-channels in the transmission pool excluding the sub-channels in the one or more COTs.

Aspect 24: The method of any of Aspects 17 through 23, wherein each sub-channel in the one or more COTs includes a time domain component and a frequency domain component, and wherein each sub-channel used to calculate the congestion control parameter includes a time domain component and a frequency domain component.

Aspect 25: The method of Aspect 24, wherein the time domain component includes all symbols in a slot configured for a physical sidelink control channel or for a physical sidelink shared channel other than an initial symbol of the slot.

Aspect 26: The method of any of Aspects 17 through 25, wherein the second RAT is a sidelink RAT.

Aspect 27: An apparatus for wireless communication at a device, comprising a processor; memory coupled with the processor; and instructions stored in the memory and executable by the processor to cause the apparatus to perform the method of one or more of Aspects 1-16.

Aspect 28: A device for wireless communication, comprising a memory and one or more processors coupled to the memory, the memory and the one or more processors configured to perform the method of one or more of Aspects 1-16.

Aspect 29: An apparatus for wireless communication, comprising at least one means for performing the method of one or more of Aspects 1-16.

Aspect 30: A non-transitory computer-readable medium storing code for wireless communication, the code comprising instructions executable by a processor to perform the method of one or more of Aspects 1-16.

Aspect 31: A non-transitory computer-readable medium storing a set of instructions for wireless communication, the set of instructions comprising one or more instructions that, when executed by one or more processors of a device, cause the device to perform the method of one or more of Aspects 1-16.

Aspect 32: An apparatus for wireless communication at a device, comprising a processor; memory coupled with the processor; and instructions stored in the memory and executable by the processor to cause the apparatus to perform the method of one or more of Aspects 17-26.

Aspect 33: A device for wireless communication, comprising a memory and one or more processors coupled to the memory, the memory and the one or more processors configured to perform the method of one or more of Aspects 17-26.

Aspect 34: An apparatus for wireless communication, comprising at least one means for performing the method of one or more of Aspects 17-26.

Aspect 35: A non-transitory computer-readable medium storing code for wireless communication, the code comprising instructions executable by a processor to perform the method of one or more of Aspects 17-26.

Aspect 36: A non-transitory computer-readable medium storing a set of instructions for wireless communication, the set of instructions comprising one or more instructions that, when executed by one or more processors of a device, cause the device to perform the method of one or more of Aspects 17-26.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        identify one or more channel occupancy times (COTs) associated with a first radio access technology (RAT) on an unlicensed band;
        calculate a congestion control parameter associated with a second RAT on the unlicensed band, wherein the congestion control parameter is calculated by excluding sub-channels in the one or more COTs; and
        use the congestion control parameter to communicate via the unlicensed band,
        wherein the one or more processors, when identifying a COT, of the one or more COTs, are configured to:
        identify a start of the COT based at least in part on detecting a preamble of a packet associated with the first RAT;
        detect a first energy level associated with the unlicensed band at a first time associated with the preamble;
        determine that a difference between the first energy level and a second energy level, detected at a second time after the first time, satisfies a threshold; and
        identify an end of the COT based at least in part on determining that the difference between the first energy level and the second energy level satisfies the threshold.

2. The UE of claim 1, wherein the congestion control parameter is calculated based at least in part on sub-channels, included in a time window, other than the sub-channels in the one or more COTs.

3. The UE of claim 1, wherein the first RAT is a Wi-Fi RAT, the preamble includes a short training field that indicates the start of the COT, and the payload includes a network allocation vector that indicates a duration of the COT.

4. The UE of claim 1, wherein the one or more processors are further configured to transmit an indication of the one or more COTs to one or more wireless communication devices.

5. The UE of claim 1, wherein the first RAT is a Wi-Fi RAT and the second RAT is a New Radio RAT.

6. The UE of claim 1, wherein the first RAT is a New Radio uplink/downlink RAT and the second RAT is a New Radio sidelink RAT.

7. The UE of claim 1, wherein the congestion control parameter is at least one of a channel busy ratio or a channel occupancy ratio.

8. The UE of claim 1, wherein the congestion control parameter is a channel busy ratio that is calculated based at least in part on:
   determining a number of sub-channels in a measurement window, excluding the sub-channels in the one or more COTs, for which a received signal strength indicator measurement satisfies a threshold; and
   dividing the number of sub-channels by a total number of sub-channels in the measurement window excluding the sub-channels in the one or more COTs.

9. The UE of claim 1, wherein the congestion control parameter is a channel occupancy ratio that is calculated based at least in part on:
   determining a number of sub-channels, excluding the sub-channels in the one or more COTs, that are granted to, reserved by, or used for a transmission by the UE in a transmission pool; and
   dividing the number of sub-channels by a total number of sub-channels in the transmission pool excluding the sub-channels in the one or more COTs.

10. The UE of claim 1, wherein each sub-channel in the one or more COTs includes a time domain component and a frequency domain component, and wherein each sub-channel used to calculate the congestion control parameter includes a time domain component and a frequency domain component.

11. The UE of claim 10, wherein the time domain component includes all symbols in a slot configured for a physical sidelink control channel or for a physical sidelink shared channel other than an initial symbol of the slot.

12. The UE of claim 1, wherein the second RAT is a sidelink RAT.

13. A method of wireless communication performed by a user equipment (UE), comprising:
   identifying one or more channel occupancy times (COTs) associated with a first radio access technology (RAT) on an unlicensed band;
   calculating a congestion control parameter associated with a second RAT on the unlicensed band, wherein the congestion control parameter is calculated by excluding sub-channels in the one or more COTs; and
   using the congestion control parameter to communicate via the unlicensed band,
   wherein the identifying the one or more COTs comprises:
      identifying a start of a COT based at least in part on detecting a preamble of a packet associated with the first RAT;
      detecting a first energy level associated with the unlicensed band at a first time associated with the preamble;
      determining that a difference between the first energy level and a second energy level, detected at a second time after the first time, satisfies a threshold; and
      identifying an end of the COT based at least in part on determining that the difference between the first energy level and the second energy level satisfies the threshold.

14. The method of claim 13, wherein the congestion control parameter is a channel busy ratio that is calculated based at least in part on:
   determining a number of sub-channels in a measurement window, excluding the sub-channels in the one or more COTs, for which a received signal strength indicator measurement satisfies a threshold; and
   dividing the number of sub-channels by a total number of sub-channels in the measurement window excluding the sub-channels in the one or more COTs.

15. The method of claim 13, wherein the congestion control parameter is a channel occupancy ratio that is calculated based at least in part on:
   determining a number of sub-channels, excluding the sub-channels in the one or more COTs, that are granted to, reserved by, or used for a transmission by the UE in a transmission pool; and
   dividing the number of sub-channels by a total number of sub-channels in the transmission pool excluding the sub-channels in the one or more COTs.

16. A non-transitory computer-readable medium storing a set of instructions for wireless communication, the set of instructions comprising:
   one or more instructions that, when executed by one or more processors of a user equipment (UE), cause the UE to:
      identify one or more channel occupancy times (COTS) associated with a first radio access technology (RAT) on an unlicensed band;
      calculate a congestion control parameter associated with a second RAT on the unlicensed band, wherein the congestion control parameter is calculated by excluding sub-channels in the one or more COTs; and
      use the congestion control parameter to communicate via the unlicensed band,
      wherein the one or more instructions, that cause the UE to identify a COT, of the one or more COTs, cause the UE to:
      identify a start of the COT based at least in part on detecting a preamble of a packet associated with the first RAT;
      detect a first energy level associated with the unlicensed band at a first time associated with the preamble;
      determine that a difference between the first energy level and a second energy level, detected at a second time after the first time, satisfies a threshold; and
      identify an end of the COT based at least in part on determining that the difference between the first energy level and the second energy level satisfies the threshold.

17. The non-transitory computer-readable medium of claim 16, wherein the congestion control parameter is calculated based at least in part on sub-channels, included in a time window, other than the sub-channels in the one or more COTs.

18. The non-transitory computer-readable medium of claim 16, wherein the one or more COTs are identified based at, least, in part on a preamble associated with the first RAT, a packet associated with the first RAT, or a combination thereof.

19. The non-transitory computer-readable medium of claim 16, wherein the one or more instructions, that cause the UE to identify a COT, of the one or more COTs, cause the UE to:
   identify a start of the COT based at least in part on detecting a preamble of a packet associated with the first RAT; and
   identify an end of the COT based at least in part on detecting a payload of the packet associated with the first RAT.

20. The non-transitory computer-readable medium of claim 19, Wherein the first RAT is a Wi-Fi RAT, the preamble includes a short training field that indicates the start of the COT, and the payload includes a network allocation vector that indicates a duration of the COT.

21. The non-transitory computer-readable medium of claim 19, wherein the one or more processors, when detecting the payload of the packet associated with the first RAT, are configured to perform resampling to convert a numerology of the first RAT to a numerology of the second RAT.

22. The non-transitory computer-readable medium of claim 16, wherein the one or more processors are further configured to transmit an indication of the one or more COTs to one or more wireless communication devices.

23. An apparatus for wireless communication, comprising:
- means for identifying one or more channel occupancy times (COTs) associated with a first radio access technology (RAT) on an unlicensed band;
- means for calculating a congestion control parameter associated with a second RAT on the unlicensed band, wherein the congestion control parameter is calculated by excluding sub-channels in the one or more COTs; and
- means for using the congestion control parameter to communicate via the unlicensed band, wherein the means for identifying the one or more COTs comprises:
- means for identifying a start of a COT based at least in part on detecting a preamble of a packet associated with the first RAT;
- means for detecting a first energy level associated with the unlicensed band at a first time associated with the preamble;
- means for determining that a difference between the first energy level and a second energy level, detected at a second time after the first time, satisfies a threshold; and
- means for identifying an end of the COT based at least in part on determining that the difference between the first energy level and the second energy level satisfies the threshold.

* * * * *